United States Patent
Yoon (12) 
(10) Patent No.: US 9,726,253 B2
(45) Date of Patent: Aug. 8, 2017

(54) TORQUE FILTER HAVING IMPACT SPRING CONSTANT AND AUXILIARY-MACHINERY BELT SYSTEM USING THE SAME

(71) Applicant: HYUNDAI MOTOR COMPANY, Seoul (KR)

(72) Inventor: Ki-Bong Yoon, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 119 days.

(21) Appl. No.: 14/788,348

(22) Filed: Jun. 30, 2015

(65) Prior Publication Data

US 2016/0153519 A1    Jun. 2, 2016

(30) Foreign Application Priority Data

Dec. 1, 2014   (KR) .................. 10-2014-0169655

(51) Int. Cl.
| | | |
|---|---|---|
| F16D 3/00 | (2006.01) |
| F16H 55/14 | (2006.01) |
| F16H 55/36 | (2006.01) |
| F16F 15/121 | (2006.01) |
| F16F 15/123 | (2006.01) |
| F16H 7/02 | (2006.01) |

(52) U.S. Cl.
CPC ............. *F16F 15/123* (2013.01); *F16H 7/02* (2013.01); *F16H 55/36* (2013.01); *F16H 2055/366* (2013.01)

(58) Field of Classification Search
CPC .... F16H 2055/366; F16H 55/36; F16H 55/14; F16D 3/66; F16F 15/1234

USPC .......................................... 474/94; 464/68.92
See application file for complete search history.

(56) References Cited

U.S. PATENT DOCUMENTS

| | | | | |
|---|---|---|---|---|
| 306,267 A | * | 10/1884 | Hoevenbergh ............ | F16D 3/66 464/67.1 |
| 447,447 A | * | 3/1891 | Daily .................. | F16H 61/6647 474/94 |
| 608,770 A | * | 8/1898 | Godfray ................... | F16D 3/66 464/67.1 |
| 1,254,542 A | * | 1/1918 | Schwinn ................... | F16D 3/66 222/360 |
| 1,518,360 A | * | 12/1924 | Royce ....................... | F01L 1/02 192/55.61 |
| 4,232,534 A | * | 11/1980 | Lamarche ............... | F16D 43/18 192/214 |
| 4,279,132 A | * | 7/1981 | Lamarche ......... | F16F 15/12313 192/213 |

(Continued)

FOREIGN PATENT DOCUMENTS

| | | |
|---|---|---|
| JP | 8-240244 A | 9/1996 |
| JP | 9-177889 A | 7/1997 |

(Continued)

*Primary Examiner* — Henry Liu
(74) *Attorney, Agent, or Firm* — McDermott Will & Emery LLP (57) ABSTRACT

A torque filter having an impact spring constant includes a pair of left and right arc springs arranged at left and right sides and having spring constant values set based on a torque of a crank shaft which transfers a driving force of an engine as the torque. An impact spring is disposed in which the pair of the left and right arc springs face each other and has a spring constant value set with a threshold torque based on an instant speed change of the crank shaft.

9 Claims, 6 Drawing Sheets

(56) References Cited

U.S. PATENT DOCUMENTS

| | | | | |
|---|---|---|---|---|
| 4,904,225 A * | 2/1990 | Worner | ............ | F16F 15/13171 192/205 |
| 5,681,221 A * | 10/1997 | Albers | ................ | F16F 15/1343 192/213 |
| 6,044,943 A * | 4/2000 | Bytzek | .................... | F16D 41/20 192/212 |
| 6,113,496 A * | 9/2000 | Oyama | ............ | F16F 15/13142 192/213.2 |
| 6,131,487 A * | 10/2000 | Jackel | ................ | F16F 15/1343 192/106 R |
| 6,161,512 A * | 12/2000 | Beels Van Heemstede | ......... | F16F 15/1232 123/192.1 |
| 6,234,127 B1 * | 5/2001 | Simpson | ............. | F16F 15/1204 123/192.2 |
| 6,361,460 B1 * | 3/2002 | Rhee | ........................ | B62M 9/00 464/62.1 |
| 6,382,164 B2 * | 5/2002 | Haas | ........................ | F02B 67/08 123/192.1 |
| 6,575,838 B2 * | 6/2003 | Jackel | ................ | F16F 15/1343 192/205 |
| 7,343,832 B2 * | 3/2008 | Jaeckel | ............... | F16F 15/1343 74/573.12 |
| 7,624,852 B2 * | 12/2009 | Mevissen | ................ | F16D 7/022 192/41 S |
| 7,954,613 B2 * | 6/2011 | Mevissen | ................ | F16D 7/022 192/41 S |
| 7,955,178 B2 * | 6/2011 | Mu | .................... | F16F 15/12373 464/68.1 |
| 8,317,642 B2 * | 11/2012 | Hartmann | ............... | F02B 63/04 464/160 |
| 8,641,563 B2 * | 2/2014 | Mende | ................ | F16F 15/1297 464/67.1 |
| 8,677,849 B2 * | 3/2014 | Simpson | ............. | F16F 15/1421 123/90.31 |
| 8,789,670 B2 * | 7/2014 | Antchak | ................ | F16D 7/022 192/212 |
| 8,863,925 B2 * | 10/2014 | Antchak | ................ | B60K 25/00 192/110 B |
| 8,932,142 B2 * | 1/2015 | Takikawa | .................. | F16D 3/66 464/64.1 |
| 9,163,713 B2 * | 10/2015 | Yoon | ....................... | F16H 55/36 |
| 2002/0128074 A1 * | 9/2002 | Jackel | ....................... | F16F 1/08 464/68.92 |
| 2004/0182196 A1 * | 9/2004 | Jaeckel | ............... | F16F 15/1343 464/68.92 |
| 2004/0250648 A1 * | 12/2004 | Chaugule | ................ | F01L 1/344 464/68.92 |
| 2005/0070362 A1 * | 3/2005 | Mende | ............. | F16F 15/13453 464/68.41 |
| 2007/0037644 A1 * | 2/2007 | Mevissen | ................ | F16D 7/022 474/70 |
| 2009/0091070 A1 * | 4/2009 | Mueller | ............... | F16F 15/1234 267/157 |
| 2010/0187066 A1 * | 7/2010 | Kneidel | .................... | F16D 3/12 192/203 |
| 2011/0263365 A1 * | 10/2011 | Mende | ................ | F16F 15/1297 474/94 |
| 2011/0315502 A1 * | 12/2011 | Antchak | ................ | F16D 7/022 192/75 |
| 2012/0208646 A1 * | 8/2012 | Takikawa | .................. | F16D 3/66 464/68.8 |
| 2014/0329607 A1 * | 11/2014 | Cegar | ........................ | F16D 3/66 464/68.1 |
| 2015/0072813 A1 * | 3/2015 | Yoon | ....................... | F16H 55/36 474/94 |
| 2015/0260233 A1 * | 9/2015 | Boyes | .................... | F16H 55/36 474/94 |
| 2015/0316138 A1 * | 11/2015 | Dell | ........................ | B60K 25/02 474/91 |
| 2015/0337934 A1 * | 11/2015 | Takikawa | ................ | F16H 45/02 192/3.28 |
| 2015/0354664 A1 * | 12/2015 | Takikawa | ................ | F16H 45/02 464/62.1 |

FOREIGN PATENT DOCUMENTS

| | | |
|---|---|---|
| KR | 10-2008-0092641 A | 10/2008 |
| KR | 10-2009-0043285 A | 5/2009 |
| KR | 10-2013-0129237 A | 11/2013 |
| WO | 2014/056097 A1 | 4/2014 |
| WO | 2014/117261 A1 | 8/2014 |

* cited by examiner

TORQUE FILTER HAVING IMPACT SPRING CONSTANT AND AUXILIARY-MACHINERY BELT SYSTEM USING THE SAME

CROSS-REFERENCE TO RELATED APPLICATIONS

This application claims the benefit of priority to Korean Patent Application No. 10-2014-0169655, filed on Dec. 1, 2014, which is incorporated herein by reference in its entirety.

TECHNICAL FIELD

The present disclosure relates to a torque filter, and particularly, to a torque filter having an impact spring constant and an auxiliary-machinery belt system using the same capable of absorbing impact transferred to an end stop at a threshold torque which is lower than a set value.

BACKGROUND

In general, an auxiliary-machinery belt includes an auxiliary-machinery pulley such as a crank pulley and an alternator which are a driving source, a power steering, an air conditioner pump, a water pump, etc. connected through a belt, such that the alternator, the power steering, the air conditioner pump, the water pump, etc. may operate by a torque of the crank pulley transferred through the auxiliary-machinery belt.

Such an auxiliary-machinery belt needs to stably maintain a predetermined belt tension. For this, the crank pulley may include a toque filter (or a crank pulley damper) which reduces an instant speed change (irregularity) of the crank pulley based on four strokes of the combustion engine, thus improving stabilization of the belt tension.

The torque filter typically uses various methods in order to efficiently reduce an instant speed change (irregularity) by using a spring to simply set a threshold torque using a spring constant.

As an example of a spring type torque filter, there are a 1_stiff (1 stage stiffness) type torque filter having one arc spring arranged at left and right sides of an end stop (or travel stop) positioned at an inner side of inside a clutch spring and contacting with a hub. T2_stiff (2 stage stiffness) type torque filter has two arc springs arranged at the left and right.

Therefore, the 1_stiff and 2_stiff type torque filters may efficiently reduce the instant speed change (irregularity) of the crank pulley, thus stably maintaining a belt tension.

However, in the torque filter to which the arc spring is applied, the end stop comes into direct contact with a crank shaft and a fixed hub, so that impact-based noises may inevitably occur between the fixed hub and the end stop depending on the size of a threshold torque.

For an instance, since the end stop is pushed back by pressing the hub and pushes the clutch spring, the end stop may turn into overrunning at a threshold torque of a set value without impact-based noises occurring when the hub and the end stop contact. Since the end stop doesn't sufficiently push the clutch spring by pressing the hub at the threshold torque which is lower than a set value, a stop condition of idle stop and go (ISG) and an idle condition in which a load is applied from an alternator occur, and thus the end stop may not overrun, which may result in an occurrence of the impact-based noises.

In particular, for the 1_stiff type torque filter, the impact-based noises, which occur at the threshold torque lower than a set value under the stop condition and the idle condition in which a load is applied from the alternator, need to be eliminated. Further, a need exists to eliminate the impact-based noises occurring under the stop condition even in the 2_stiff type torque filter in which the impact-based noises may be eliminated under the idle condition in which load is applied from the alternator.

SUMMARY

An aspect of the present inventive concept provides an auxiliary-machinery belt system using a torque filter capable of eliminating impact-based noises between an end stop and a hub at a threshold torque which is lower than a set value, in which an impact spring having a predetermined spring constant different from an arc spring is disposed between the hub and the end stop which separate the arc spring into left and right sides in a space at an inner side of a clutch spring.

Other objects and advantages of the present inventive concept can be understood by the following description, and become apparent with reference to the embodiments of the present inventive concept. In addition, it is obvious to those skilled in the art to which the present disclosure pertains that the objects and advantages of the present inventive concept can be realized by the means as claimed and combinations thereof.

In accordance with an embodiment of the present inventive concept, a torque filter having an impact spring constant may include a pair of left and right arc springs arranged at left and right sides and having spring constant values set based on a torque of a crank shaft which transfers a driving force of an engine as the torque. An impact spring is disposed in which the pair of the left and right arc springs face each other and has a spring constant value set with a threshold torque based on an instant speed change of the crank shaft.

The torque filter may further include a hub fixed at the crank shaft in which the pair of the left and right arc springs face each other. An end stop is pressurized by the hub and pushes a clutch spring. The impact spring is disposed between the hub and the end stop.

Each of the left and right arc springs includes a large wire diameter spring, and a small wire diameter spring which is inserted into the inner diameter of the large wire diameter of spring. The large wire diameter spring and the small wire diameter spring have different spring constant values.

In accordance with another embodiment of the present inventive concept, an auxiliary-machinery belt system may include a torque filter including a hub fixed at a crank shaft which receives, as a torque, a driving force of an engine. A pair of left and right arc springs each has a spring constant value set based on the torque of the crank shaft and arranged at left and right sides of the hub. An impact spring is disposed between the hub and an end stop which is pressurized by the hub and pushes a clutch spring, and has a spring constant value set with a threshold torque based on an instant speed change of the crank shaft. A crank pulley is connected with the torque filter, and an auxiliary-machinery pulley is connected to each other through a driving shaft. A belt interconnects the crank pulley and the auxiliary-machinery pulley, thus transferring the torque of the crank shaft.

The torque filter according to the present disclosure has an advantage in that any impact-based noises do not occur in overrunning when a threshold torque is lower than a set value under a stop condition and an idle condition in which a load is applied from an alternator by providing an impact spring having a predetermined spring constant different from that of an arc spring.

In addition, the present disclosure has an advantage in that impact-based noise control performance may be improved irrespective of kinds of the torque filters, so that an impact spring of the torque filter o may be applied to a 1_stiff type torque filter in which one arc spring is disposed at left and right sides, respectively, and applied to a 2_stiff type torque filter with two arc springs at left and right sides.

In addition, since the torque filter with reduced impact-based noises according to the present disclosure may be used at a crank pulley, it is possible to enhance stabilization of a belt tension of an auxiliary-machinery belt system of an engine.

DESCRIPTION OF SPECIFIC EMBODIMENTS

The terms and words used in the specification and claims should not be construed as their ordinary or dictionary sense. On the basis of the principle that the inventor can define the appropriate concept of a term in order to describe his/her own invention in the best way, it should be construed as meaning and concepts for complying with the technical idea of the present invention. Accordingly, the embodiments described in the present specification and the construction shown in the drawings are nothing but exemplary embodiments, and it does not cover all the technical ideas of the invention. Thus, it should be understood that various changes and modifications may be made at the time of filing the present application. In addition, detailed descriptions of functions and constructions well known in the art may be omitted to avoid unnecessarily obscuring the gist of the present invention. Exemplary embodiments of the present inventive concept will be described below in more detail with reference to the accompanying drawings.

Figure 1:
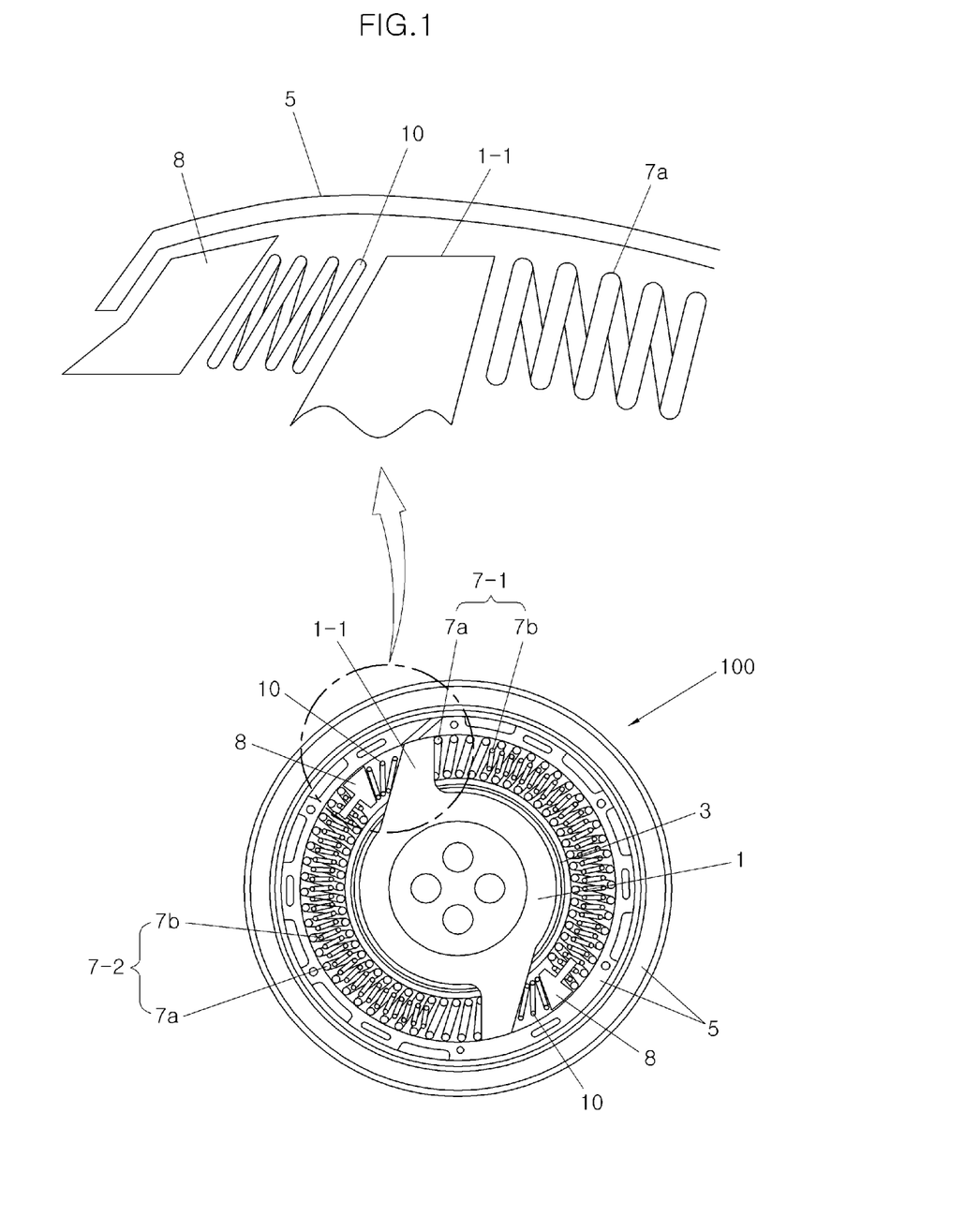
FIG. 1 is a view illustrating a 2_stiff (2 stage stiffness) torque filter using two arc springs according to the present disclosure.

FIG. 1 is an exemplified view illustrating a configuration where a torque filter having an impact spring constant is formed in a 2_stiff (2 stage stiffness) spring using two arc springs according to the present disclosure. As illustrated therein, a 2_stiff type torque filter 100 may include a hub 1, a shell plate 3, a clutch spring 5, left and right arc springs 7-1 and 7-2, an end stop 8, and an impact spring 10.

The hub 1 is fixed at a crank shaft converting a driving force of an engine into a torque and rotates together with the crank shaft. In particular, a hub pressing unit 1-1 integrally extends from a center of the hub 1 and is disposed between the left and right arc springs 7-1 and 7-2. The shell plate 3 mounts the left and right arc springs 7-1 and 7-2 and has a circular shape with a hole in the center thereof. The clutch spring 5 surrounds the hub 1 and the shell plate 3 and expands based on movement of the end stop 8 by the hub 1, thus forming a frictional force against the crank shaft. Here, a crank pulley incorporates a 2_stiff type torque filter 100 which is a driving source to drive an auxiliary-machinery belt.

The left and right arc springs 7-1 and 7-2 are mounted on the shell plate 3 with the hub pressing unit 1-1 of the hub 1 disposed between the left and right arc springs 7-1 and 7-2, thus forming almost symmetrical layout in an inner space of the clutch spring 5. In particular, each of the left and right arc springs 7-1 and 7-2 is formed of a large wire diameter of spring 7a and a small wire diameter of spring 7b. The small wire diameter of spring 7b has a diameter inserted into an inner diameter of the large wire diameter of spring 7a and has a length shorter than that of the large wire diameter of spring 7a.

When a threshold torque is transferred through the hub 1, the end stop 8 is pushed back while keeping contact with the hub pressing unit 1-1 of the hub 1 so that the clutch spring 5 generating the frictional force against the crank shaft may expand.

The impact spring 10 is located between the hub pressing unit 1-1 of the hub 1 and the end stop 8, so that the impact spring 10 may react against any variation in the threshold torque due to an instant speed change (irregularity) of the crank shaft. The impact spring 10 may be a coil spring.

Figure 2:
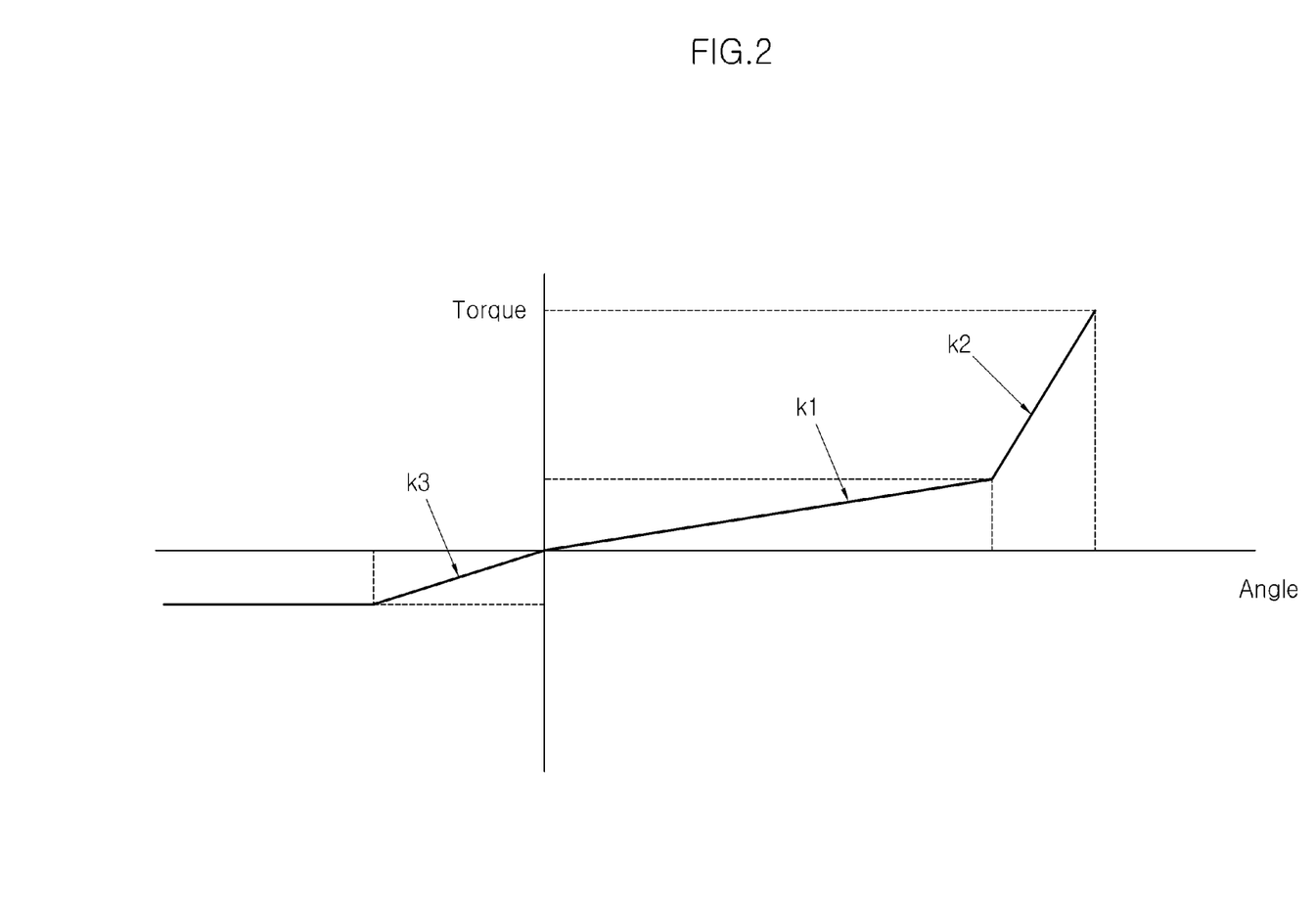
FIG. 2 is a diagram illustrating a crank shaft torque-spring characteristic curve of the 2_stiff torque filter of FIG. 1.

Therefore, the 2_stiff type torque filter 100 may have three different spring constants k1, k2, and k3 as shown in the crank shaft torque-spring characteristic curve diagram in FIG. 2. The spring constants k1 and k2 are spring constant values of the left and right arc springs 7-1 and 7-2 and may be set depending on the torque transferred to the crank shaft. More specifically, k1 is a spring constant value of the large wire diameter of spring 7a, and k2 is a spring constant value of each of the large wire diameter of spring 7a and the small wire diameter of spring 7b. The spring constant k3 is a spring constant value of the impact spring 10, and the spring constant k3 may be set depending on the threshold torque differently from the spring constants k1 and k2 of the left and right arc springs 7-1 and 7-2.

As a result, the 2_stiff type torque filter 100 may have a damping operation using the spring constants k1 and k2 of the left and right arc springs 7-1 and 7-2 with respect to the torque of the crank shaft. Overrunning may be acquired using the spring constant k3 of the impact spring 10 with respect to the threshold torque of the crank shaft. In particular, the spring constant k3 of the impact spring 10 may buffer or absorb an impact that the end stop 8 receives, due to the hub 1 at the threshold torque lower than a set value, so that the impact-based noises of the hub 1 and the end stop 8 may be largely weakened or eliminated.

Figure 3:
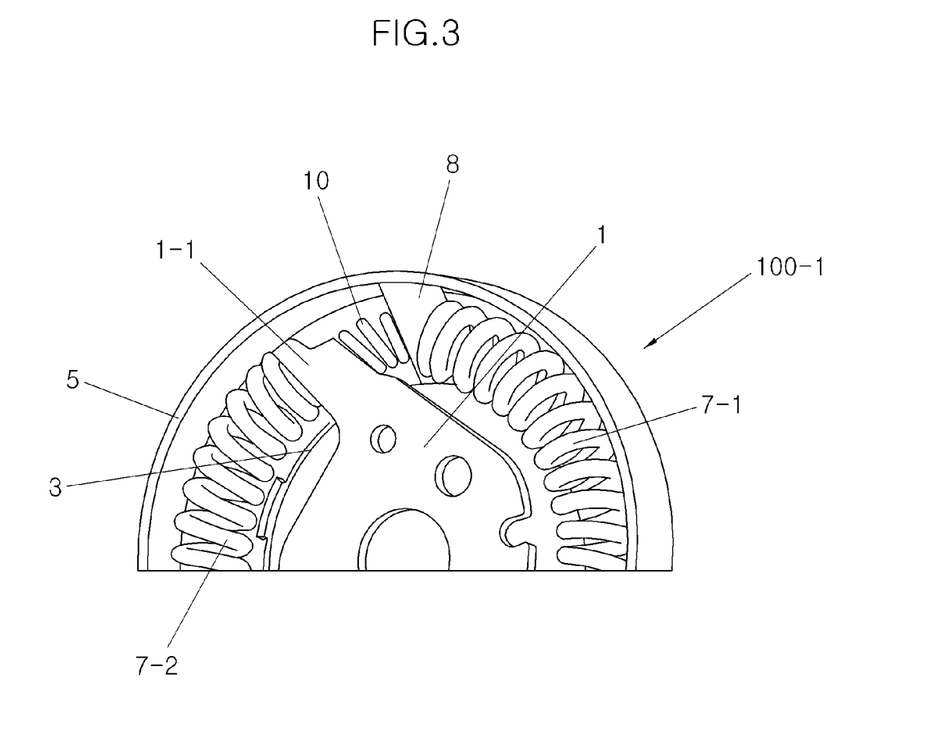
FIG. 3 is a view illustrating a 1_stiff (1 stage stiffness) torque filter using one arc spring according to the present disclosure.
Figure 4:
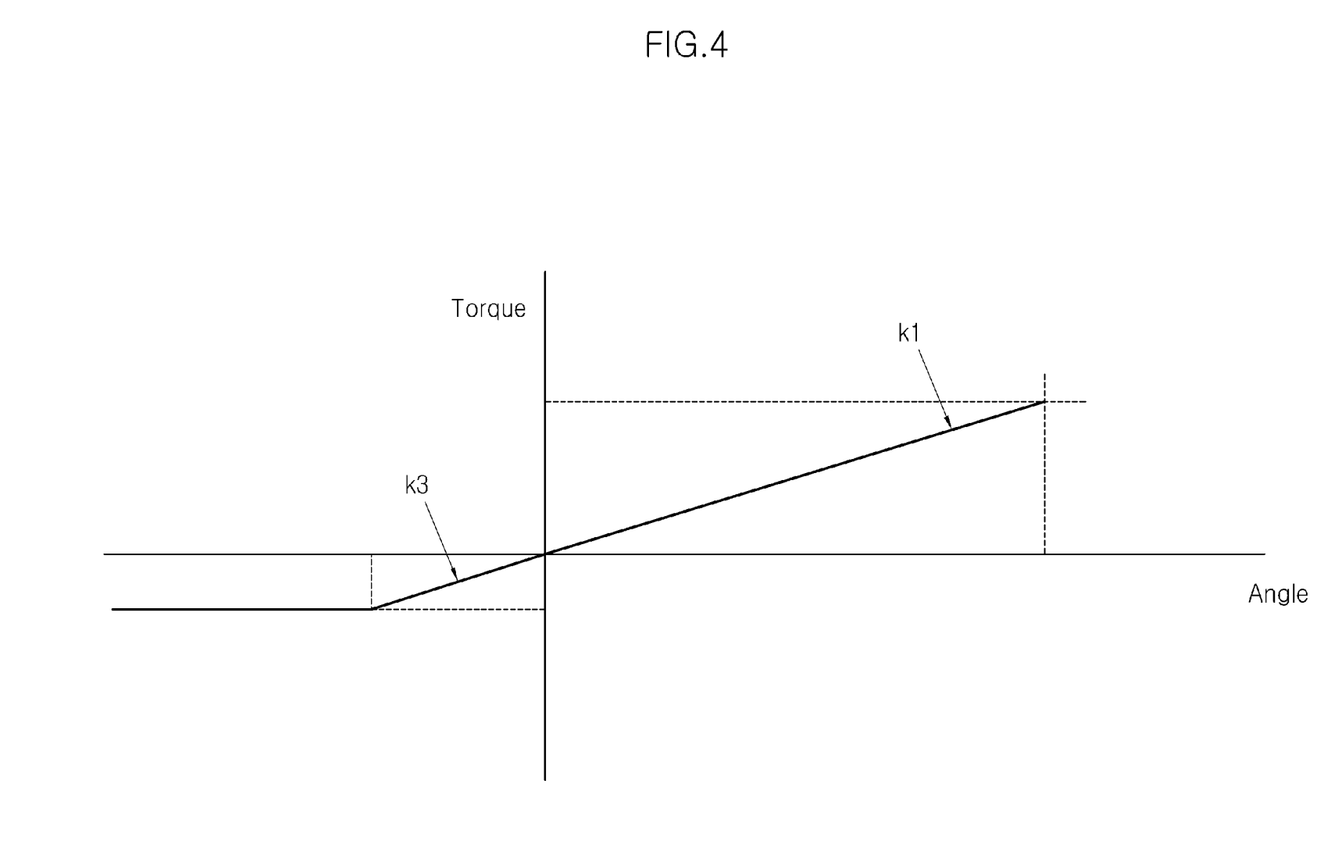
FIG. 4 is a diagram illustrating a crank shaft torque-spring characteristic curve of the 1_stiff torque filter of FIG. 3.

FIG. 3 is a view illustrating an example of the 1_stiff type torque filter 100-1 according to the exemplary embodiment of the present inventive concept. FIG. 4 is a diagram illustrating a crank shaft torque—spring characteristic curve of the 1_stiff type torque filter 100-1. As illustrated therein, the 1_stiff type torque filter 100-1 may include a hub 1, a shell plate 3, a clutch spring 5, left and right arc springs 7-1 and 7-2, an end stop 8, and an impact spring 10. Therefore, the 1_stiff type torque filter 100-1 may be constituted in the same way as the 2_stiff type torque filter 100 as described above along with FIGS. 1 and 2. However, the left and right arc springs 7-1 and 7-2 of the 1_stiff type torque filter 100-1 may be one arc spring.

Figure 5:
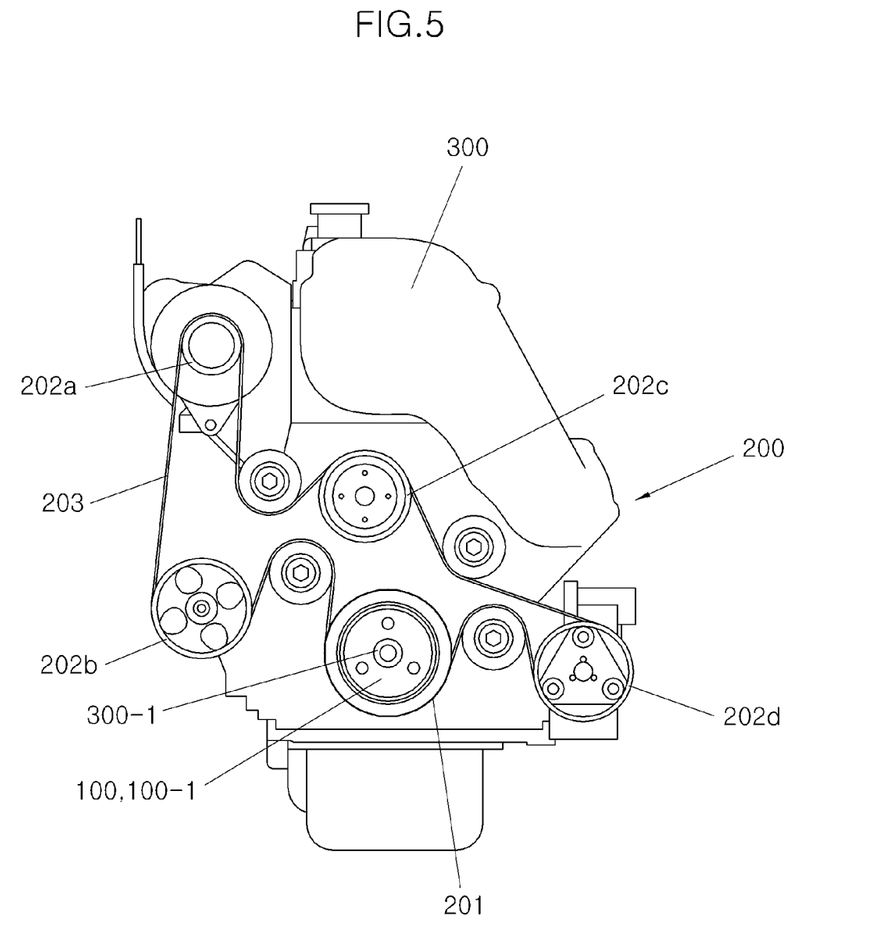
FIG. 5 is a view illustrating a torque filter having an impact spring constant and an auxiliary-machinery belt system using the same according to the preset disclosure.

FIG. 5 is an exemplified view illustrating a configuration of an auxiliary-machinery belt system 200 to which the 2_stiff type torque filter 100 or the 1_stiff type torque filter 100-1 is applied, according to an exemplary embodiment of the present inventive concept.

As illustrated therein, the auxiliary-machinery belt system 200 may be applied to an engine 300 and may include a crank pulley 201, auxiliary-machinery pulleys 202a, . . . , 202d and a belt 203.

More specifically, the crank pulley 201 may rotate by a crank shaft 300-1 which uses as a rotation torque the driving force of the engine 300, and the 2_stiff type torque filter 100 or the 1_stiff type torque filter 100-1 is fixed at the crank shaft 300-1 through the hub 1, so that the 2_stiff type torque filter 100 or the 1_stiff type torque filter 100-1 may be integrated at the crank pulley 201. The auxiliary-machinery pulleys 202a, . . . , 202d are connected through a driving shaft to the auxiliary-machinery devices such as an alternator, a power steering, an air conditioner pump, a water pump, etc. The belt 203 interconnects the crank pulley 201 and the auxiliary-machinery pulleys 202a, . . . , 202d, so that the torque of the crank pulley 201 may be transferred to the auxiliary-machinery pulleys 202a, . . . , 202d, thus operating the alternator, the power steering, the air conditioner pump, the water pump, etc.

Figure 6:
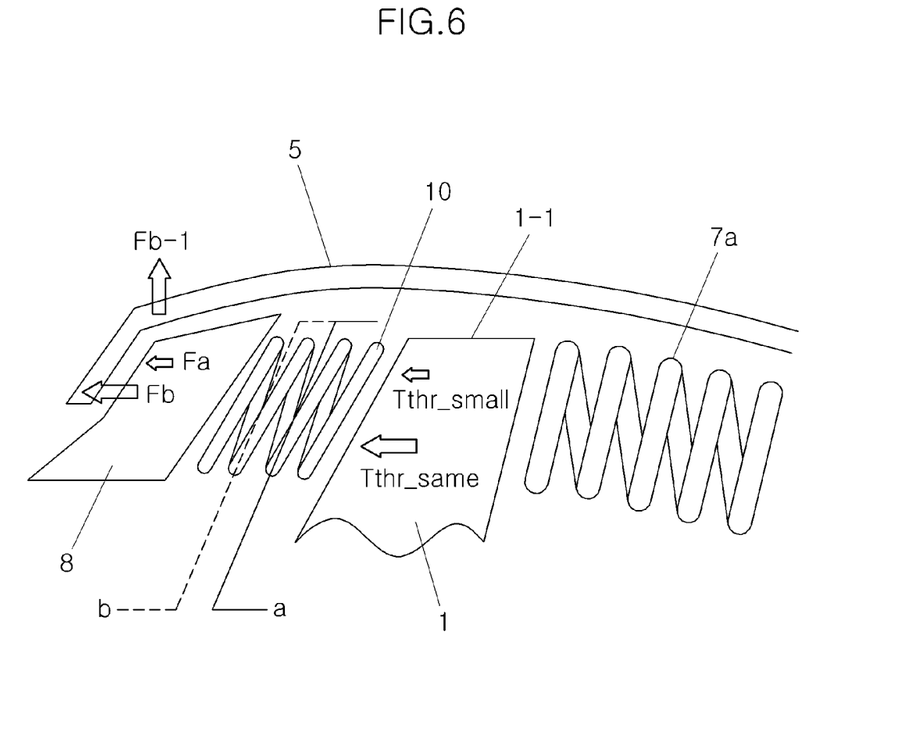
FIG. 6 is a view illustrating an operation state of an impact spring when a threshold torque varies due to an instant speed change (irregularity) transferred to the auxiliary-machinery belt system according to the present disclosure.

FIG. 6 is a view illustrating an operation state of the 2_stiff type torque filter 100 or the 1_stiff type torque filter 100-1 which are integrated at the crank pulley 201 belonging to the auxiliary-machinery belt system 200 according to the present disclosure.

As illustrated therein, Tthr_same means a state where the threshold torque which refers to a set value applies to the 2_stiff type torque filter 100 or the 1_stiff type torque filter 100-1, whereas Tthr_small means a state where the threshold torque which is lower than a set value applies to the 2_stiff type torque filter 100 or the 1_stiff type torque filter 100-1.

Under the operation state of Tthr_same, the impact spring 10 which receives Tthr_same that the hub pressing unit 1-1 of the hub 1 applies and absorbs the impact of Tthr_same based on a spring constant k3 turning into an enough compression state 'b', and as a result, Tthr_same applies an enough pressing force Fb to the end stop 8. Therefore, the clutch spring 5 is pushed back by the end stop 8, so that the enough pressing force Fb may operate as an expansion force Fb-1 of the clutch spring 5. The expanded clutch spring 5 may have a friction force against the crank pulley 201, so that the turning into the overrunning may be acquired without any impact-based noises.

The impact spring 10, which receives Tthr_small that the hub pressing unit 1-1 of the hub 1 applies, may turn into a slight less compression state 'a' while buffering the impact of Tthr_small based on a spring constant k3 under the Tthr_small condition. As a result, Tthr_small applies a less pressing force Fa to the end stop 8. Therefore, since the clutch spring 5 won't be pushed back by the end stop 8, less pressing force Fa won't operate as an expansion force of the clutch spring 5. However, the slight less compression state 'a' of the impact spring 10 buffers the impacts of Tthr_small, so the impact-based noises don't spread out.

As described above, the auxiliary-machinery belt system according to the present disclosure may include the torque filters 100 and 100-1 each having a pair of left and right arc springs 7-1 and 7-2 which have spring constant values set based on the torque of the crank shaft 300-1 transferring a driving force of the engine 300, and are arranged symmetrically at left and right sides. The impact spring 10 has a spring constant value set based on the threshold torque due to the instant peed change (irregularity) of the crank shaft 300-1 and is positioned where the pair of the left and right arc springs 7-1 and 7-2 face each other, thus eliminating the impact-based noises of the end stop 8 and the hub 1 at the threshold torque which is lower than the set value.

While the present disclosure has been described with respect to the specific embodiments, it will be apparent to those skilled in the art that various changes and modifications may be made without departing from the spirit and scope of the invention as defined in the following claims

What is claimed is:

1. A torque filter having an impact spring constant, comprising:
   an end stop, which is pressurized by a hub and which pushes a clutch spring;
   a pair of left and right arc springs arranged at left and right sides of the torque filter and having spring constant values set based on a torque of a crank shaft which transfers a driving force of an engine as the torque; and
   an impact spring disposed in which the pair of the left and right arc springs face each other and having a spring constant value set with a threshold torque based on an instant speed change of the crank shaft,
   wherein the impact spring is disposed between the hub and the end stop and is elastically supported against a lateral surface of the hub so that the hub and the end stop face each other at the lateral surface, and
   wherein when the threshold torque is transferred through the hub, the end stop is pushed back while keeping contact with the hub so that the clutch spring, which generates a frictional force against the crank shaft, expands.

2. The torque filter of claim 1, further comprising:
   a hub fixed at the crank shaft, in which the pair of the left and right arc springs face each other;
   wherein the impact spring is disposed between the hub and the end stop.

3. The torque filter of claim 1, wherein the hub includes a hub pressing unit extending from a center of the hub to upper and lower sides at the lateral surface of the hub and contacting the impact spring.

4. The torque filter of claim 2, wherein the impact spring is a coil spring.

5. The torque filter of claim 1, wherein each of the left and right arc springs includes a large wire diameter spring and a small wire diameter spring which is inserted into an inner diameter of the large wire diameter spring, and
   the large wire diameter spring and the small wire diameter spring have different spring constant values.

6. The torque filter of claim 1, wherein each of the left and right arc springs is one arc spring.

7. An auxiliary-machinery belt system, comprising:
   a torque filter including: a hub fixed at a crank shaft which receives, as a torque, a driving force of an engine; a pair of left and right arc springs each having a spring constant value set based on the torque of the crank shaft and arranged at left and right sides of the hub; and an impact spring disposed between the hub and an end stop which is pressurized by the hub and pushes a clutch spring and having a spring constant value set with a threshold torque based on an instant speed change of the crank shaft;
   a crank pulley connected with the torque filter;

an auxiliary-machinery pulley connected to each other; and
a belt interconnecting the crank pulley and the auxiliary-machinery pulley to transfer the torque of the crank pulley,
wherein the impact spring is disposed between the end stop and the hub, and
wherein when the threshold torque is transferred through the hub, the end stop is pushed back while keeping contact with the hub so that the clutch spring, which generates a frictional force against the crank shaft, expands.

8. The system of claim 7, wherein each of the pair of the left and right arc springs includes a large wire diameter spring and a small wire diameter spring which is inserted into the inner diameter of the large wire diameter of spring, and
the large wire diameter spring and the small wire diameter spring have different spring constant values.

9. The system of claim 7, wherein each of the left and right arc springs is one arc spring.

\* \* \* \* \*